United States Patent
Garnett et al.

[11] Patent Number: 6,163,140
[45] Date of Patent: Dec. 19, 2000

[54] START-UP CIRCUIT FOR VOLTAGE REGULATORS

[75] Inventors: Martin E. Garnett, Los Gatos; Andrew M. Cowell, San Jose; Steve I. Chaney, Mountain View, all of Calif.

[73] Assignee: Micrel Incorporated, San Jose, Calif.

[21] Appl. No.: 09/495,488

[22] Filed: Feb. 1, 2000

[51] Int. Cl.[7] .................................. G05F 1/10; H02J 3/12
[52] U.S. Cl. ........................................ 323/234; 323/901
[58] Field of Search ............................. 363/49; 323/901, 323/234

[56] References Cited

U.S. PATENT DOCUMENTS

| | | | |
|---|---|---|---|
| 4,236,198 | 11/1980 | Ohsawa et al. | 363/49 |
| 4,644,247 | 2/1987 | Burmenko | 320/39 |
| 4,686,616 | 8/1987 | Williamson | 363/21 |
| 4,695,936 | 9/1987 | Whittle | 363/21 |
| 4,890,211 | 12/1989 | Telefus | 363/37 |
| 5,528,132 | 6/1996 | Doluca | 323/284 |
| 5,546,294 | 8/1996 | Schutten et al. | 363/17 |
| 5,568,044 | 10/1996 | Bittner | 323/272 |
| 5,596,465 | 1/1997 | Honda et al. | 361/18 |
| 5,666,044 | 9/1997 | Tuozzolo | 323/277 |
| 5,694,304 | 12/1997 | Telefus et al. | 363/21 |
| 5,801,518 | 9/1998 | Ozaki et al. | 323/222 |

OTHER PUBLICATIONS

IEEE, "Integration of High–Voltage NMOS Devices into a Submicron BiCMOS Process Using Simple Structural Changes," Yong Qiang Li et al., (1994), pp. 16.3.1–16.3.4.
Siliconix incorporated, *1988 Integrated Circuits Data Book*, (1988) printed in U.S.A., pp. 10–35–10–42.

*Primary Examiner*—Shawn Riley
*Assistant Examiner*—Bao Q. Vu
*Attorney, Agent, or Firm*—Skjerven Morrill MacPherson LLP; Brian D. Ogonowsky; Mark E. Schmidt

[57] ABSTRACT

A start-up circuit for voltage regulators includes a depletion mode field effect transistor (FET) having a drain electrically coupled to an input voltage, a source electrically coupled to the voltage regulator power supply input terminal and to a voltage corresponding to an output voltage of the voltage regulator, a body at a fixed voltage, and a gate electrically coupled to the output of a comparator. At start-up, the voltage regulator is powered through the FET. The drain current is self-limiting, preventing the source of the FET from rising to the level of the input voltage. When the rising output voltage of the regulator reaches a level that can operate the regulator control circuit, the comparator grounds the gate of the FET to turn off the FET, and the voltage regulator operates off of its own output. Virtually no power is dissipated in the FET during steady-state operation of the regulator.

16 Claims, 3 Drawing Sheets

START-UP CIRCUIT FOR VOLTAGE REGULATORS

BACKGROUND OF THE INVENTION

1. Field of the Invention

The invention relates to a circuit for providing power to a voltage regulator at start-up.

2. Description of the Related Art

Voltage regulator circuits typically convert an unregulated DC input voltage into a regulated DC output voltage of a predetermined value. Voltage regulators in frequent use include pulse width modulation (PWM) switching converters such as those described in U.S. Pat. Nos. 4,236,198; 4,686,616; 4,695,936; and 4,890,211, incorporated herein by reference, pulse frequency modulation (PFM) switching converters such as those described in U.S. Pat. Nos. 5,568,044 and 5,801,518, incorporated herein by reference, resonant switching converters such as those described in U.S. Pat. Nos. 5,546,294 and 5,694,304, incorporated herein by reference, and linear converters such as that described in U.S. Pat. No. 4,644,247, incorporated herein by reference.

Typically, voltage regulation is accomplished by a voltage regulator control circuit that monitors the output voltage and uses feedback to keep the output voltage constant. Generally, the voltage regulator control circuit itself must be powered by a regulated voltage. When the voltage regulator is operating, the control circuit may advantageously be powered by a regulated voltage derived from the output of the voltage regulator. However, there is a transient period when the voltage regulator is turned on during which the voltage regulator is not providing a steady regulated output voltage and cannot power the voltage regulator control circuit.

Start-up circuits are known that switch the voltage regulator operating voltage from the power supply voltage to the regulated voltage. However, these start-up circuits suffer from various drawbacks depending on the type of circuit. Some drawbacks include their use of high value resistors and power consumption even after the start-up period.

What is needed is a start-up circuit for voltage regulators that does not suffer from the drawbacks of prior art start-up circuits.

SUMMARY

A start up circuit for voltage regulators includes a depletion mode field effect transistor with its body held at a fixed voltage, its drain electrically coupled to an unregulated power supply voltage, its source electrically coupled to the voltage regulator control circuit's power supply input terminal, and its gate electrically coupled to the output of a comparator.

At start-up, when the unregulated power supply voltage is switched on or the voltage regulator is enabled, the voltage regulator control circuit is powered through the depletion mode field effect transistor. Advantageously, drain current through the depletion mode field effect transistor is self-limiting, i.e., as the source voltage rises with respect to the body voltage, the drain current is reduced.

In one embodiment, a comparator has one input electrically coupled to a reference voltage and its other input electrically coupled to: 1) a regulated voltage generated by the regulator; 2) the source of the transistor; and 3) the control circuit power supply input terminal. The comparator detects when the rising regulated output voltage exceeds the reference voltage threshold. At that time, the comparator grounds the gate of the transistor to turn it off so that the control circuit is now totally powered by the regulated voltage. Even in the absence of gate control, the self-limiting behavior of the transistor prevents the source from rising to a dangerously high voltage level. This adds reliability and safety to the system.

During steady-state operation, the grounding of the gate, while the source is held at the regulator control circuit's input voltage, ensures the transistor conducts no current. The start-up circuit requires much less real estate than prior art circuits and consumes essentially no power during steady state operation.

In the above embodiment, the voltage regulator may provide a regulated output voltage with a magnitude as low as the magnitude of the conduction threshold gate-source voltage of the transistor.

DETAILED DESCRIPTION

Figure 1:
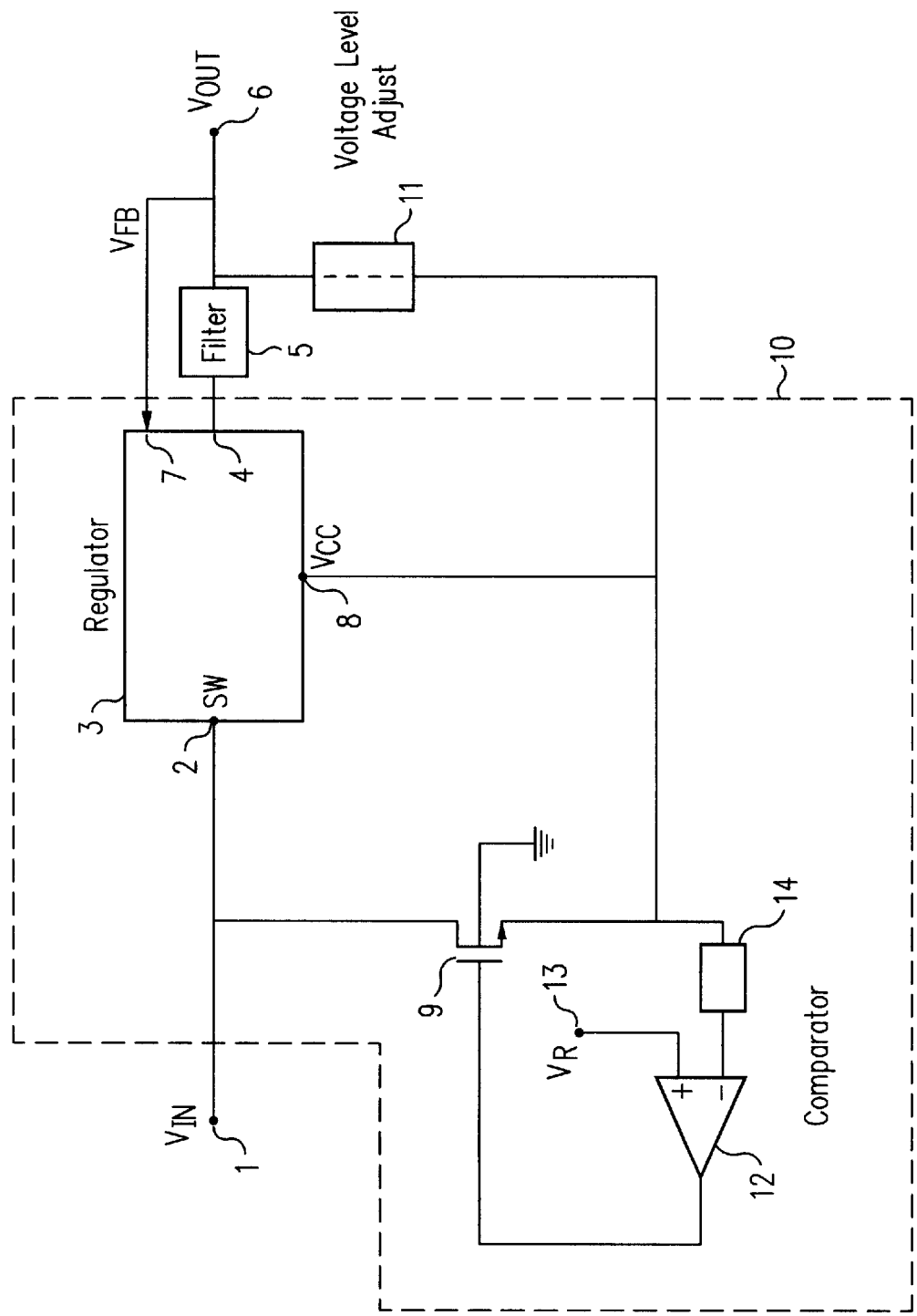
FIG. 1 is a schematic diagram of a voltage regulator including a start-up circuit in accordance with one embodiment of the present invention.

FIG. 1 is a schematic diagram of a voltage regulator including one embodiment of the inventive start-up circuit. An unregulated DC voltage source provides an input voltage 1 (VIN) to the switch input terminal 2 of regulator 3. Regulator 3 may be, for example, a pulse width modulation (PWM) switching converter, a pulse frequency modulation (PFM) switching converter, a resonant switching converter, a linear converter, or any other type of regulator. The present invention is independent of the type of regulator used.

Regulator 3 regulates the voltage applied to terminal 2 in such a way as to provide a regulated signal at the regulator's output terminal 4. In the example of FIG. 1, it is assumed that regulator 3 is a pulse type regulator whose regulated pulses are filtered by filter 5 to provide a regulated DC output voltage 6 ($V_{OUT}$). Such controlling may be by adjusting the duty cycle of one or more switches or adjusting the frequency of switching. These regulation techniques are well known and need not be described in detail. Such regulators typically feed back a portion of the output voltage ($V_{FB}$) to a feedback input terminal 7 and compare the feedback voltage $V_{FB}$ to a reference. Depending on the comparison, the regulator controls the switching transistors (or a series transistor) to transfer more or less current from the unregulated voltage source to the filter 5 to maintain a regulated voltage $V_{OUT}$ despite changing load current requirements.

Regulator 3 has a power supply input terminal 8. The voltage present at the power supply input terminal 8, which powers a control circuit in regulator 3, will be referred to herein as $V_{CC}$.

Of course, any regulator may have many more input and output terminals depending on the system requirements.

The depletion mode field effect transistor (FET) 9 has a drain electrically coupled to the DC input voltage 1, a source electrically coupled to the regulator control circuit power supply input terminal 8, a gate, and a body held at a fixed voltage. In one embodiment, the body is grounded, but the fixed voltage can be any suitable voltage. Since the source is electrically coupled to the regulator control circuit power supply input terminal, the source is at voltage $V_{CC}$. In one embodiment, FET 9 has a conduction threshold voltage of $V_{GS}$~-2.5 V. That is, FET 9 is conducting when the gate-to-source voltage is more positive than -2.5 volts.

FET 9 may be a discrete component but, in the preferred embodiment, FET 9 is formed on the same integrated circuit chip as the control circuit in regulator 3. Dashed outline 10 indicates what would typically be internal to an integrated circuit incorporating the regulator and the start-up circuit. The switching transistors or series transistor may be internal or external to the integrated circuit chip.

Voltage level adjust 11 has an input terminal electrically coupled to the regulated output voltage $V_{OUT}$ and an output terminal electrically coupled to the power supply input terminal 8 of regulator 3. A voltage level adjust is optional, depending on whether the regulator control circuit can operate from the fill output voltage of the regulator. Voltage level adjust 11 may take any form. In the example of a regulator without an output transformer, level adjust 11 may be a voltage divider.

Alternatively, a transformer may transform a pulsed regulated signal at the regulator output terminal 4 to a second pulsed signal that is then filtered by a filter to obtain a suitable operating voltage $V_{CC}$. Such circuits are well known for feeding back a regulated voltage to power the regulator.

As regulator 3 begins operating, $V_{OUT}$ rises and drives $V_{CC}$ toward its steady-state value. At some point during the rise of $V_{OUT}$, the output of level adjust 11 will be within the range required to power the control circuit in regulator 3.

Comparator 12 has a noninverting input electrically coupled to a reference voltage 13 ($V_R$), an inverting input electrically coupled to the regulator power supply input terminal 8, and an output electrically coupled to the gate of FET 9. Comparator 12 detects when $V_{CC}$ exceeds a threshold value set by $V_R$, and at that time grounds the gate of FET 9. The interval between start-up and the grounding of the gate is typically less than 10 ms.

The threshold value for grounding the gate of FET 9 is chosen to be larger than the magnitude of the conduction threshold value of $V_{GS}$, so FET 9 stops conducting when comparator 12 grounds its gate. Advantageously, virtually no power is dissipated in FET 9 during steady-state operation of the voltage regulator circuit.

Advantageously, since the magnitude of the conduction threshold value of $V_{GS}$ can be less than 3 volts, regulators with an input voltage $V_{IN}$ regulated down to a fairly low output voltage $V_{OUT}$, only slightly higher than $V_{GS}$, can be used.

Additional components may be electrically coupled between the various elements shown in FIG. 1. For example, a voltage divider 14 may be electrically coupled to the inverting input of comparator 12 to provide a voltage derived from $V_{CC}$ to the comparator for comparison to the reference voltage $V_R$. Alternatively, $V_{CC}$ and the input to comparator 12 may be obtained from different windings of a transformer.

Figure 2:
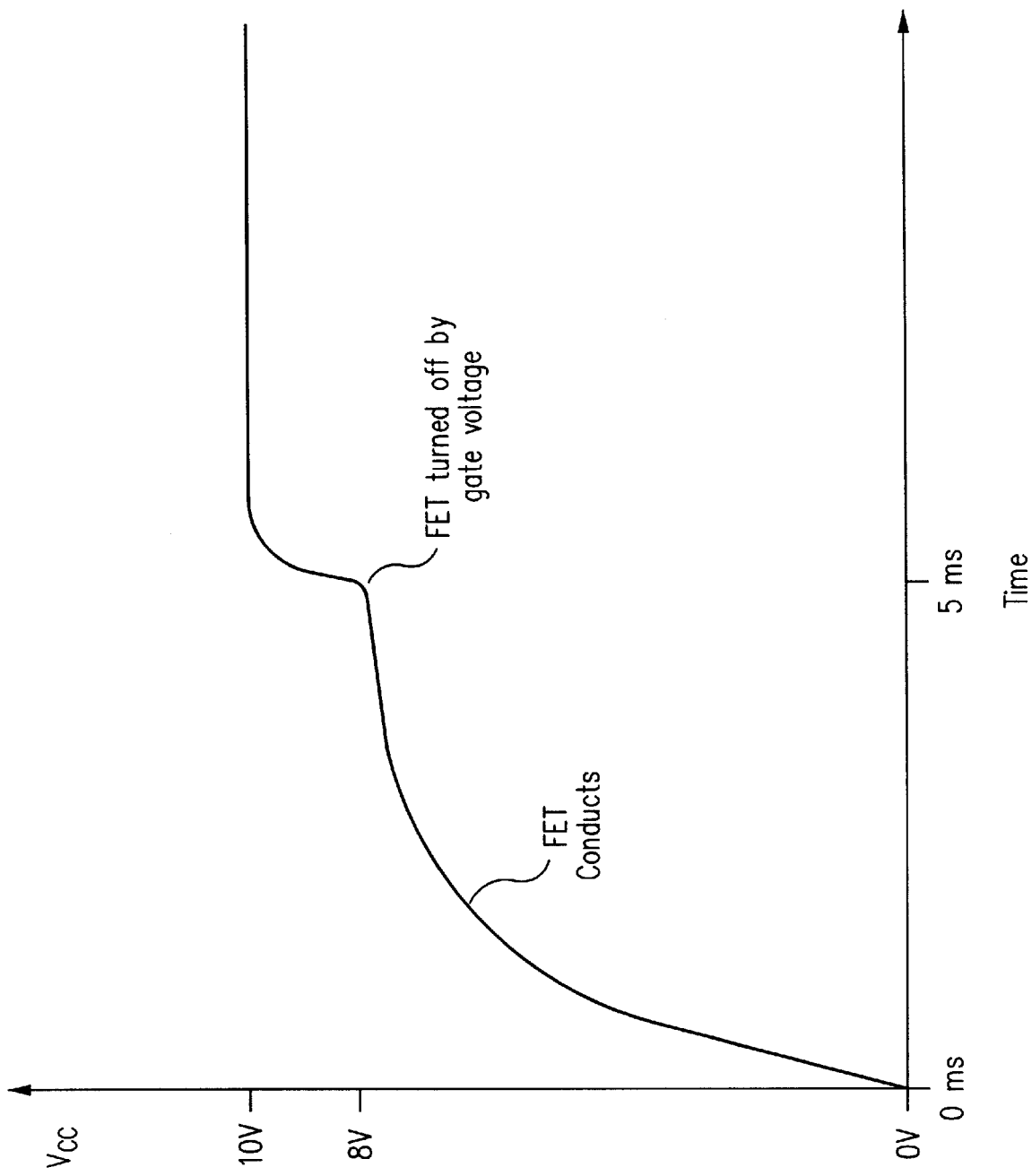
FIG. 2 is a graph of $V_{CC}$ vs. time, where $V_{CC}$ is the power supply voltage to the regulator's control circuit.

At start-up, when the unregulated voltage is switched on or the voltage regulator 3 is enabled, the voltage regulator circuit is not providing a regulated output voltage $V_{OUT}$. Consequently, the gate voltage of FET 9 is high because the comparator 12 outputs a high logic signal. Under these conditions, FET 9 initially conducts a large drain current, causing $V_{CC}$ to rise, as shown in the graph of FIG. 2. Since the body is held at a fixed voltage, as $V_{CC}$ rises $V_{SB}$ also rises.

Advantageously, conduction through FET 9 is controlled by $V_{SB}$ as well as by $V_{GS}$. As $V_{SB}$ increases, conduction through FET 9 decreases. In one embodiment, for example, with an FET having a particular ratio of depletion channel width to length, with the body grounded, and with $V_{GS}$ above the conduction threshold voltage, at start-up $V_{SB}$ rises to settle at ~7–8 volts, and the drain current decreases to settle at ~10–15 mA. This is referred to as debiasing.

The self-limiting behavior of FET 9 is important from a safety standpoint, as it prevents $V_{CC}$ from rising to dangerously high voltages, regardless of the operation of comparator 12. If, in contrast, the source and the body of FET 9 were electrically coupled so that $V_{SB}$~0, then if comparator 12 failed to trigger and $V_{GS}$ were above the conduction threshold voltage, $V_{CC}$ might rise to a dangerously high voltage.

The $V_{CC}$ generated at start-up due to conduction through FET 9 initially powers regulator 3 to generate a rising $V_{OUT}$. At some point, the rising output of level adjust 11 trips comparator 12, and conduction through FET 9 is turned off, as shown in FIG. 2. This trip point, in FIG. 2, is set to 8 volts. The $V_{OUT}$ and $V_{CC}$ continue to rise to their steady state voltages. In the example of FIG. 2, the steady state voltage of $V_{CC}$ is 10 volts.

Figure 3:
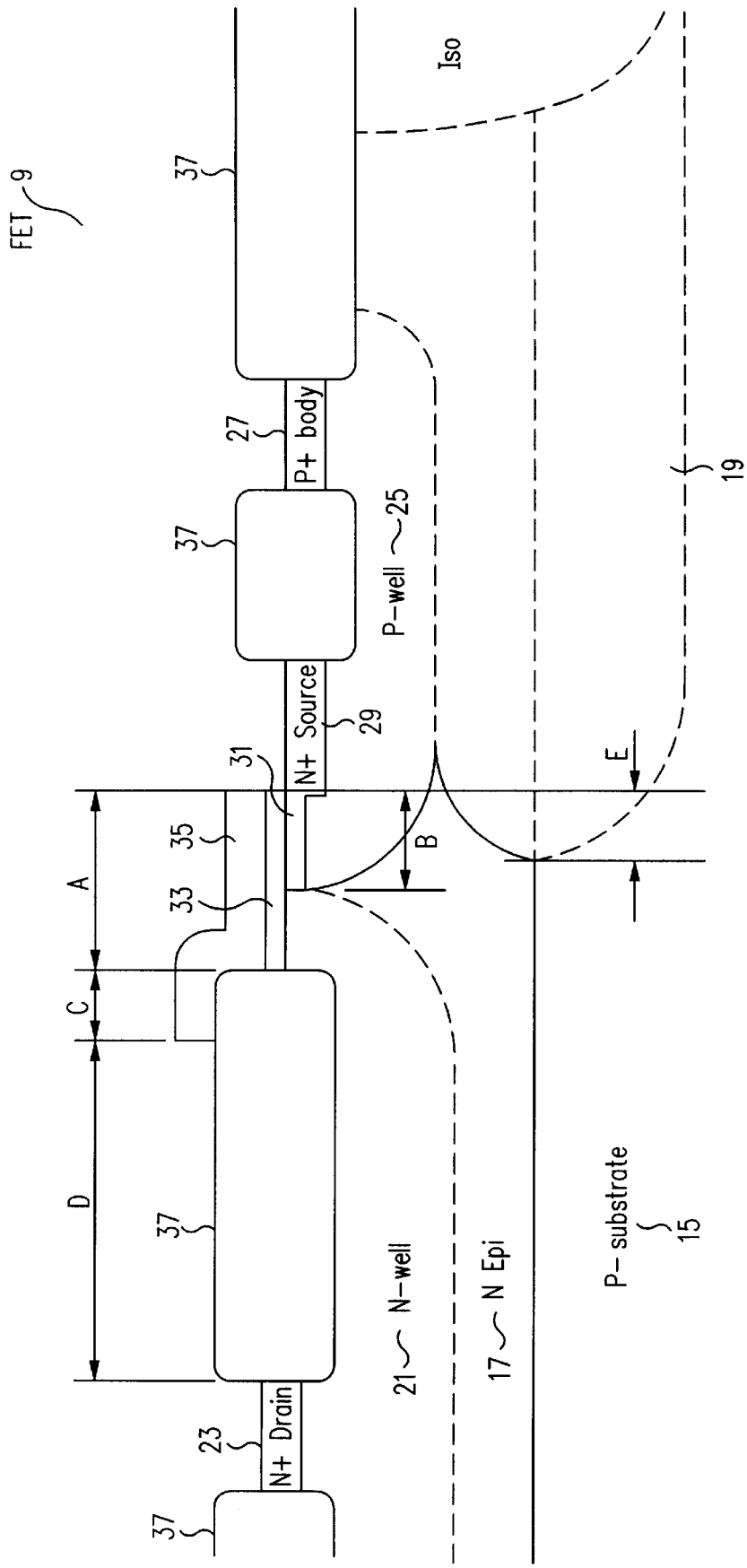
FIG. 3 is a schematic diagram of a high voltage depletion mode field effect transistor utilized in one embodiment of the present invention.

The various regions and layers of a self-aligned high voltage field effect transistor utilized as FET 9 in one embodiment of the present invention are illustrated in FIG. 3. Substrate 15 is a P-type silicon substrate having a resistivity of ~5–10 ohms-cm. An N-type epitaxial layer 17 with resistivity of 3-ohms-cm is formed overlying substrate 15. Epitaxial layer 17 is ~7.5 microns thick when first formed.

A buried isolation layer 19 of P-type silicon is formed along one portion of the interface between substrate 15 and epitaxial layer 17 by implantation of boron ions in the substrate.

N-well 21 is formed in epitaxial layer 17 by implantation of phosphorous ions. An $N^+$ region 23 is formed in N-well 21. N-well 21 and $N^+$ region 23 together form the drain of FET 9, with $N^+$ region 23 serving as a drain contact.

P-well 25 is formed in epitaxial layer 17 by implantation of boron ions. A $P^+$ region 27 is formed in P-well 25. P-well 25 and $P^+$ region 27 together form the body of FET 9, with $P^+$ region 27 serving as a body contact.

An $N^+$ region 29 is also formed in P-well 25. $N^+$ region 29 serves as a source for FET 9. A channel region 31 of lightly doped N-type silicon is formed in region 25 by implantation of arsenic ions, thereby making FET 9 a depletion mode device. A gate oxide layer 33, approximately 500 Å thick, is formed overlying channel 31 and a portion of N-well 21. A conductive polysilicon gate 35, approximately 0.4 micron thick, overlies gate oxide layer 33 and serves as a gate for FET 9.

Field oxide regions 37 separate the various regions of FET 9 from one another.

Various dimensions of FET 9 are denoted by the letters A–E. These dimensions are: A~5 microns, B~3 microns, C>3 microns, D>12 microns, and E~2 microns.

The breakdown voltage and other operating characteristics for FET 9 are affected by the thickness of the gate oxide layer 33, by the thickness of and dopant concentrations in substrate 15, epitaxial layer 17, channel 31, N-well 21, and P-well 25, and by dimensions A–E.

Preferably, FET 9 is formed on the same die as the regulator 3 control circuit and comparator 12; however, FET 9 and all other components may be provided as discrete components.

While the present invention is illustrated with particular embodiments, the invention is intended to include all variations and modifications falling within the scope of the appended claims.

We claim:

1. A start-up circuit for a voltage regulator, said voltage regulator for providing a regulated voltage, said regulator having an operating voltage input terminal, said start-up circuit comprising:

a depletion mode field effect transistor, said transistor having a drain electrically coupled to receive a power supply voltage, a source electrically coupled to said operating voltage input terminal and electrically coupled to receive a voltage corresponding to an output voltage of said regulator, a body at a fixed voltage, and a gate; and a comparator having a first input terminal electrically coupled to receive said voltage corresponding to said output voltage of said regulator, said comparator having its output terminal electrically coupled to said gate of said transistor.

2. The start-up circuit of claim 1 wherein said comparator has a second input terminal electrically coupled to a reference voltage such that, if said comparator detects that said voltage corresponding to said output voltage exceeds said reference voltage, said comparator causes a voltage to be applied to said gate of said transistor to turn said transistor off.

3. The start-up circuit of claim 1 wherein said fixed voltage is ground.

4. The start-up circuit of claim 1 wherein said depletion mode field effect transistor has a conduction threshold gate-source voltage more positive than about −3 volts.

5. The start-up circuit of claim 1 wherein said source is directly coupled to said operating voltage input terminal with no electrical components therebetween.

6. The start-up circuit of claim 1 wherein said output terminal of said comparator is directly coupled to said gate with no electrical components therebetween.

7. The start-up circuit of claim 1 wherein said output voltage of said regulator is greater than said voltage corresponding to said output voltage.

8. The start-up circuit of claim 1 wherein said output voltage of said regulator is also said voltage corresponding to said output voltage.

9. The start-up circuit of claim 1 further comprising a voltage divider having an input terminal electrically coupled to said output voltage and an output terminal electrically coupled to said operating voltage input terminal, whereby said output voltage is divided to provide said operating voltage.

10. The start-up circuit of claim 1 wherein said drain is also electrically coupled to a switch power supply input terminal of said regulator.

11. A method of operating a voltage regulator, said voltage regulator for providing a regulated voltage, said regulator having an operating voltage input terminal, said method comprising:

applying a power supply voltage to a drain of a depletion mode field effect transistor;

applying a fixed voltage to a body of said transistor;

applying a source voltage of said transistor to said regulator operating voltage input terminal;

applying a first voltage corresponding to an output voltage of said regulator to said regulator operating voltage input terminal;

applying a second voltage corresponding to said output voltage to a first input terminal of a comparator; and applying a reference voltage to a second input terminal of said comparator such that, if said comparator detects that said second voltage exceeds said reference voltage, said comparator applies an output voltage to a gate of said transistor to turn said transistor off.

12. The method of claim 11 wherein said first voltage equals said second voltage.

13. The method of claim 11 wherein said fixed voltage is ground.

14. The method of claim 11 wherein said depletion mode field effect transistor has a conduction threshold gate-source voltage more positive than about −3 volts.

15. The method of claim 11 further comprising applying said output voltage to said operating voltage input terminal.

16. The method of claim 11 further comprising dividing said output voltage with a voltage divider and applying a divided voltage to said operating voltage input terminal.

* * * * *